United States Patent
West et al.

(10) Patent No.: US 10,041,840 B2
(45) Date of Patent: Aug. 7, 2018

(54) VARIABLE FREQUENCY DRIVE TEMPERATURE DETERMINATION

(71) Applicant: Trane International Inc., Piscataway, NJ (US)

(72) Inventors: Nathan Thomas West, Holmen, WI (US); Benjamin James Sykora, Holmen, WI (US)

(73) Assignee: Trane International Inc., Piscataway, NJ (US)

( * ) Notice: Subject to any disclaimer, the term of this patent is extended or adjusted under 35 U.S.C. 154(b) by 367 days.

(21) Appl. No.: 14/802,181

(22) Filed: Jul. 17, 2015

(65) Prior Publication Data

US 2015/0323396 A1     Nov. 12, 2015

Related U.S. Application Data

(63) Continuation of application No. PCT/US2014/012631, filed on Jan. 23, 2014.
(Continued)

(51) Int. Cl.
*G01K 1/00* (2006.01)
*G01K 1/16* (2006.01)
(Continued)

(52) U.S. Cl.
CPC ............... *G01K 1/16* (2013.01); *G01K 7/00* (2013.01); *G01K 13/00* (2013.01); *G01K 13/02* (2013.01); *G01K 2217/00* (2013.01)

(58) Field of Classification Search
USPC .................. 374/134, 178, 141, 166
See application file for complete search history.

(56) References Cited

U.S. PATENT DOCUMENTS

| | | |
|---|---|---|
| 6,874,329 B2 | 4/2005 | Stark et al. |
| 2008/0174955 A1 | 7/2008 | Eddy et al. |

(Continued)

OTHER PUBLICATIONS

Korean Patent Office, International Search Report and Written Opinion, PCT/US2014/012631, Trane International Inc., dated Apr. 28, 2014, 12 pgs.

*Primary Examiner* — Mirellys Jagan
(74) *Attorney, Agent, or Firm* — Taft Stettinius & Hollister LLP

(57) ABSTRACT

Temperature value determination of at least one variable frequency drive component is provided. In one form, a method includes providing a variable frequency drive that includes a first component in thermal communication with a second component in thermal communication with a switching device. A temperature value of the second component is determined using a temperature value of the first component, a power loss characteristic of the drive, and a first characteristic of heat transfer between the first and second components. The method further includes sensing a temperature value of the second component and determining a temperature value for the switching device using the power loss characteristic, a second characteristic of heat transfer between the second component and the switching device, and the greater of the sensed and determined temperature values of the second component. Further embodiments, forms, features, and aspects shall become apparent from the description and drawings.

12 Claims, 4 Drawing Sheets

Related U.S. Application Data

(60) Provisional application No. 61/755,615, filed on Jan. 23, 2013.

(51) Int. Cl.
  *G01K 13/00* (2006.01)
  *G01K 7/00* (2006.01)
  *G01K 13/02* (2006.01)

(56) References Cited

U.S. PATENT DOCUMENTS

| | | |
|---|---|---|
| 2008/0303469 A1 | 12/2008 | Nojima |
| 2009/0072770 A1* | 3/2009 | Son .................. B60L 3/06 318/139 |
| 2009/0094997 A1 | 4/2009 | McSweeney |
| 2011/0194256 A1 | 8/2011 | De Rijck et al. |

* cited by examiner

VARIABLE FREQUENCY DRIVE TEMPERATURE DETERMINATION

BACKGROUND

The present application relates to the determination of temperature values of one or more components of a variable frequency drive, and more particularly but not exclusively, to the determination of a temperature value of a switching device of the variable frequency drive.

As the use of variable frequency drives to control electric motors becomes more commonplace, further advances in the design and operation of the same are desired. For example, the temperature of the internal junction of a switching device of a variable frequency drive can be a limiting factor to its operation. Indeed, if the maximum temperature rating of the internal junction of the switching device is exceeded, then damage and/or failure of the variable frequency drive may result. In contrast, the life and reliability of the variable frequency drive may be enhanced by not exceeding the maximum temperature rating of the internal junction of the switching device. Readily knowing the temperature of the internal junction of the switching device can be beneficial for avoidance of exceeding its maximum temperature rating; however, the internal junction temperature of a switching device is not easily measured. In view of the foregoing, there is a demand for further improvements in this area of technology.

SUMMARY

Temperature value determination of at least one component of a variable frequency drive is provided. More particularly, in one embodiment, a method includes providing a variable frequency drive that includes a first component in thermal communication with a second component in thermal communication with a switching device. A temperature value of the second component is determined using a temperature value of the first component, a power loss characteristic of the drive, and a first characteristic of heat transfer between the first and second components. The method further includes sensing a temperature value of the second component and determining a temperature value for the switching device using the power loss characteristic, a second characteristic of heat transfer between the second component and the switching device, and the greater of the sensed and determined temperature values of the second component.

In another embodiment, a method includes providing a variable frequency drive including a first component in thermal communication with a second component in thermal communication with a switching device; determining a temperature value of the second component using a temperature value of the first component, a power loss characteristic of the drive, and a first characteristic of heat transfer between the first component and the second component; sensing a temperature value of the second component; and determining a temperature value for the switching device using the power loss characteristic, a second characteristic of heat transfer between the second component and the switching device, and the greater of the sensed temperature value of the second component and the determined temperature value of the second component.

In still another embodiment, a system includes inverter circuitry including one or more transistors in thermal communication with a substrate, a heat sink in thermal communication with the inverter circuitry, and a controller. The controller is configured to determine a temperature of the heat sink, determine a temperature of the substrate as the greater of a sensed temperature value of the substrate and a calculated temperature value of the substrate based upon the determined temperature of the heat sink, and determine an internal temperature of the one or more transistors based upon the determined temperature of the substrate and a thermal impedance between the substrate and the one or more transistors.

In yet another embodiment, a method includes determining a first temperature value of a first component of a system including a variable frequency drive using a temperature value of a second component of the system in thermal communication with the first component, a power loss characteristic of the drive, and a thermal impedance between the first and second components. The method also includes sensing a temperature value of the first component; determining a second temperature value of the first component using the sensed temperature of the first component and a thermal time constant of the first component; and determining a temperature value for a third component of the system in thermal communication with the first component using the greater of the first determined temperature value of the first component and the second determined temperature value of the first component, the power loss characteristic of the drive, and a thermal impedance between the first and third components.

Other aspects include unique methods, systems, devices, kits, assemblies, equipment, and/or apparatus related to estimating or determining a temperature value of one or more components of a variable frequency drive.

Further aspects, embodiments, forms, features, benefits, objects, and advantages shall become apparent from the detailed description and figures provided herewith.

DETAILED DESCRIPTION OF REPRESENTATIVE EMBODIMENTS

Figure 1:
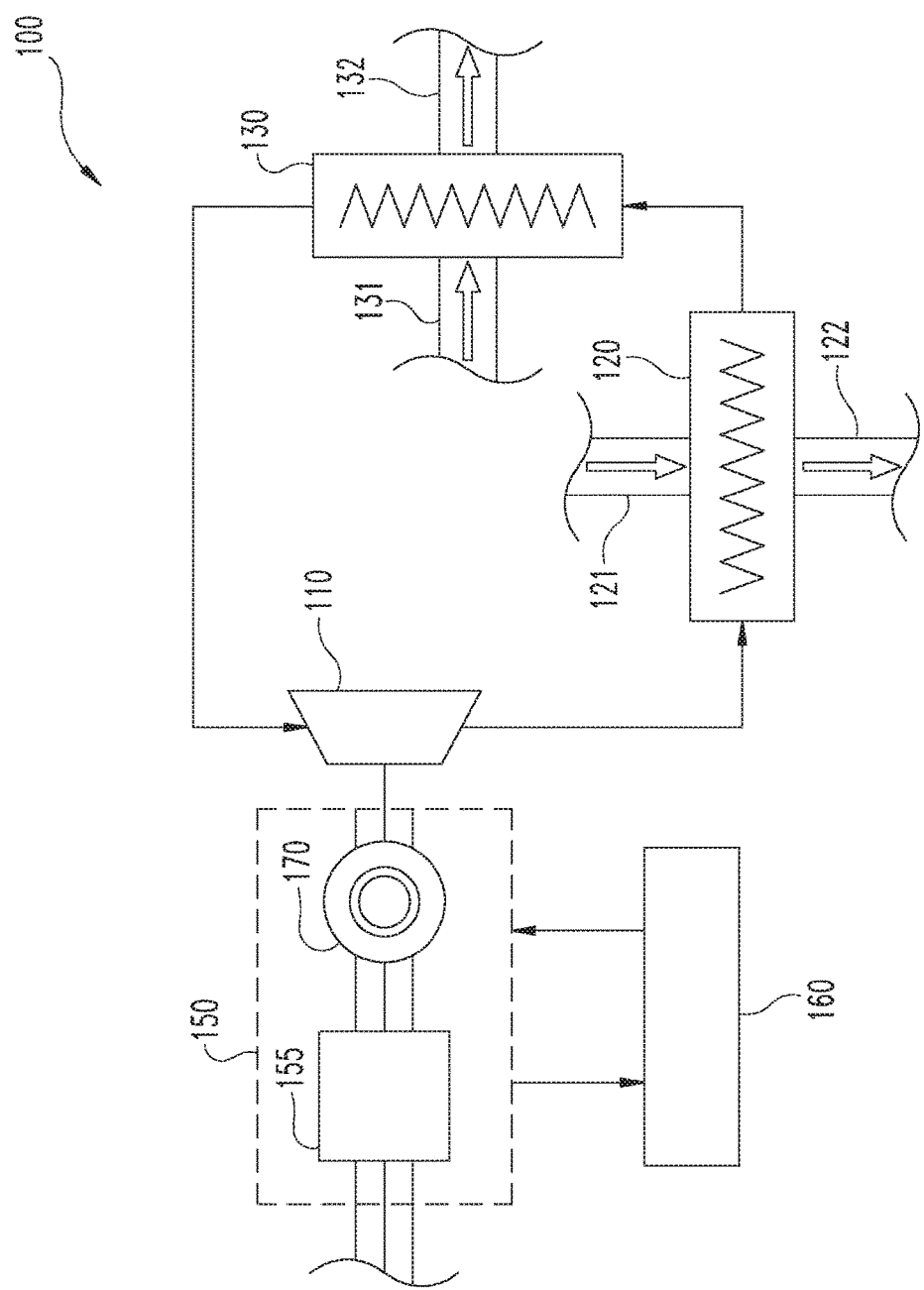
FIG. 1 is a schematic illustration of an exemplary system including a variable frequency drive.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

In one aspect, an approach for determining or estimating a temperature value of at least one component of a variable frequency drive is provided. In one form, a method includes providing a variable frequency drive that includes a first component in thermal communication with a second component in thermal communication with a switching device. A temperature value of the second component is determined using a temperature value of the first component, a power loss characteristic of the drive, and a first characteristic of heat transfer between the first and second components. The method further includes sensing a temperature value of the second component and determining a temperature value for the switching device using the power loss characteristic, a second characteristic of heat transfer between the second component and the switching device, and the greater of the sensed and determined temperature values of the second component. Further embodiments, forms, features, and aspects shall become apparent from the description and drawings.

The temperature value determination or estimation of at least one component of a variable frequency drive disclosed herein may be performed or conducted in connection with a variable frequency drive being used in one of a variety of different applications. By way of non-limiting example, one application including a variable frequency drive where the temperature value of at least one of its components may be determined or estimated is chiller system 100 illustrated in FIG. 1. Chiller system 100 includes a refrigerant loop that includes a compressor 110, a condenser 120, and an evaporator 130. Refrigerant flows through system 100 in a closed loop from compressor 110 to condenser 120 to evaporator 130 and back to compressor 110. Various embodiments may also include additional refrigerant loop elements including, for example, valves for controlling refrigerant flow, refrigerant filters, economizers, oil separators and/or cooling components and flow paths for various system components.

Compressor 110 is driven by a drive unit 150 including an electric motor 170 which is driven by a variable frequency drive 155. In one form, variable frequency drive 155 is configured to output a three-phase PWM drive signal, and motor 170 is a surface magnet permanent magnet motor. Use of other types and configurations of variable frequency drives and electric motors such as interior magnet permanent magnet motors, reluctance motors, or inductance motors are also contemplated. It shall be appreciated that the principles and techniques disclosed herein may be applied to a broad variety of drive and permanent magnet motor configurations.

Condenser 120 is configured to transfer heat from compressed refrigerant received from compressor 110. In one form, condenser 120 is a water cooled condenser which receives cooling water at an inlet 121, transfers heat from the refrigerant to the cooling water, and outputs cooling water at an output 122. It is also contemplated that other types of condensers may be utilized, for example, air cooled condensers or evaporative condensers. It shall further be appreciated that references herein to water include water solutions comprising additional constituents unless otherwise limited.

Evaporator 130 is configured to receive refrigerant from condenser 120, expand the received refrigerant to decrease its temperature and transfer heat from a cooled medium to the refrigerant. In one form, evaporator 130 is configured as a water chiller which receives water provided to an inlet 131, transfers heat from the water to the refrigerant, and outputs chilled water at an outlet 132. It is contemplated that a number of particular types of evaporators and chiller systems may be utilized, including dry expansion evaporators, flooded type evaporators, bare tube evaporators, plate surface evaporators, and finned evaporators among others.

Chiller system 100 further includes a controller 160 which outputs control signals to variable frequency drive 155 to control operation of motor 170 and compressor 110. Controller 160 also receives information about the operation of drive unit 150 including, but not limited to, information relating to motor current, motor terminal voltage, and/or other operational characteristics of motor 170 and variable frequency drive 155. It shall be appreciated that the controls, control routines, and control modules described herein may be implemented using hardware, software, firmware and various combinations thereof and may utilize executable instructions stored in a non-transitory computer readable medium or multiple non-transitory computer readable media. It shall further be understood that controller 160 may be provided in various forms and may include a number of hardware and software modules and components such as those disclosed herein.

Figure 2:
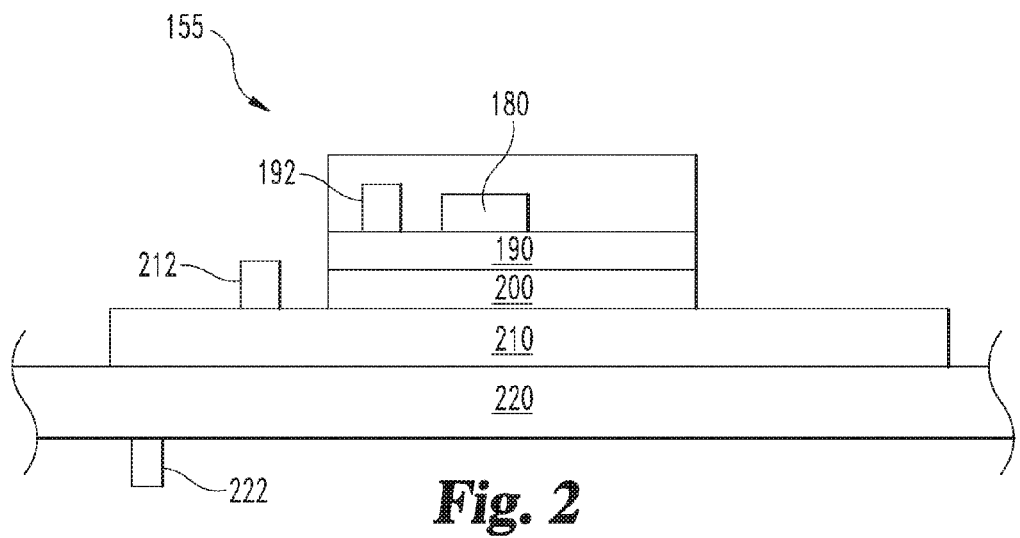
FIG. 2 is a schematic illustration of the variable frequency drive of the system of FIG. 1.
Figure 3:
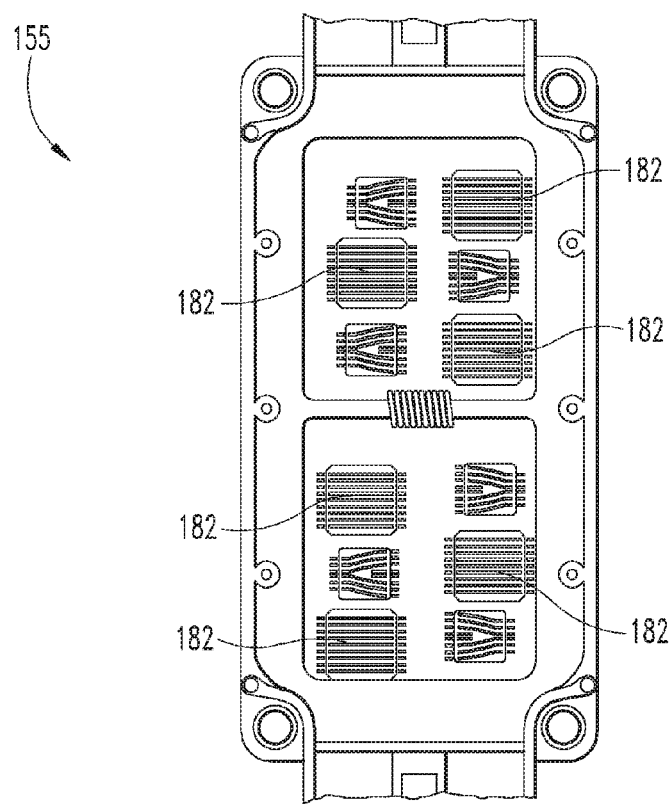
FIG. 3 is a photographic image of a portion of the variable frequency drive of FIG. 2.

Turning now to FIG. 2, one non-limiting arrangement of variable frequency drive 155 is schematically illustrated. Variable frequency drive 155 includes a switching device 180 positioned on and in thermal communication with a thermally conductive base or substrate 190. Switching device 180 includes one or more internal switching junctions and in one non-limiting embodiment is in the form of one or more insulated gate bipolar transistors (IGBT's). In another form, switching device 180 is a power MOSFET. With reference to the photographic image of FIG. 3 for example, variable frequency drive 155 includes a plurality of IGBT's 182. Base 190 may be formed from a variety of different thermally conductive materials or combinations of materials. For example, in one particular but non-limiting form, base 190 is formed from copper or an alloy thereof. A thermal pad 200 is positioned between base 190 and a heat sink 210, although forms in which thermal pad 200 is omitted and base 190 is positioned directly on heat sink 210 are also contemplated. It should further be understood that forms in which one or more additional components are positioned between switching device 180 and base 190 and/or between base 190 and heat sink 210 are possible.

Heat sink 210 is formed of a thermally conductive material and is in thermal communication with base 190 and a cooling medium 220. In this arrangement, heat sink 210 is configured to absorb heat created by switching device 180 during operation of variable frequency drive 155 and transfer the heat to cooling medium 220. Cooling medium 220 may be in any form suitable for absorbing and moving heat away from heat sink 210, examples of which include air, water, glycol or a refrigerant, just to provide a few possibilities. In one particular but non-limiting form, cooling medium 220 is refrigerant of the refrigerant loop that includes compressor 110, condenser 120, and evaporator 130, and heat is transferred away from heat sink 210 by the refrigerant. In another form, cooling medium 220 could be part of a separate heat transfer system that includes a closed loop of cooling medium 220 and a heat exchanger configured to release heat from cooling medium 220 to ambient environment or another cooling medium, although other variations are possible.

Variable frequency drive 155 also includes a number of sensors positioned at different locations and configured to measure temperatures and provide sensed temperature values to controller 160. More particularly, variable frequency drive 155 includes sensor 192 configured to measure temperature of base 190 and provide a sensed temperature value of base 190 to controller 160, sensor 212 configured to measure temperature of heat sink 210 and provide a sensed temperature value of heat sink 210 to controller 160, and sensor 222 configured to measure temperature of cooling medium 220 and provide a sensed temperature value of cooling medium 220 to controller 160. In the illustrated embodiment, variable frequency drive 155 includes a single sensor at each separate location. In other non-illustrated forms however, variable frequency drive 155 includes a plurality of sensors at each location such that a plurality of sensed temperature values are provided to controller 160 for each of base 190, heat sink 210 and cooling medium 220. Forms in which variable frequency drive 155 does not include a sensor at one or more of these locations, or includes sensors at locations in addition to or in lieu of these locations, are also possible.

Figure 4:
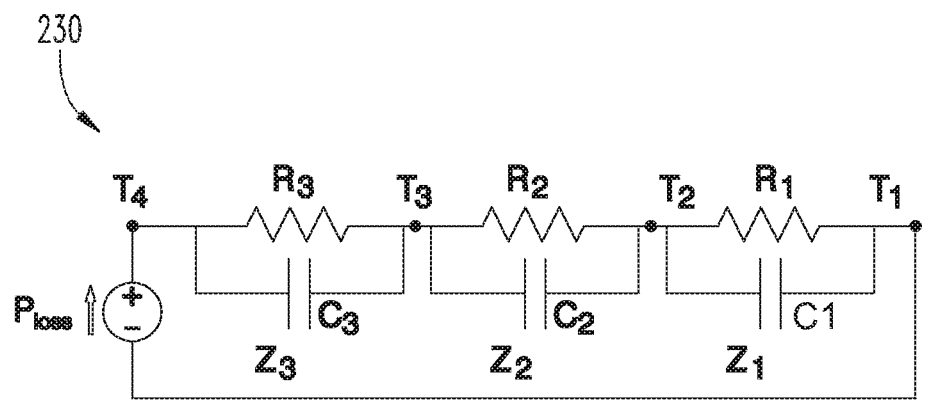
FIG. 4 is a schematic illustration of an equivalent circuit thermal model.
Figure 5:
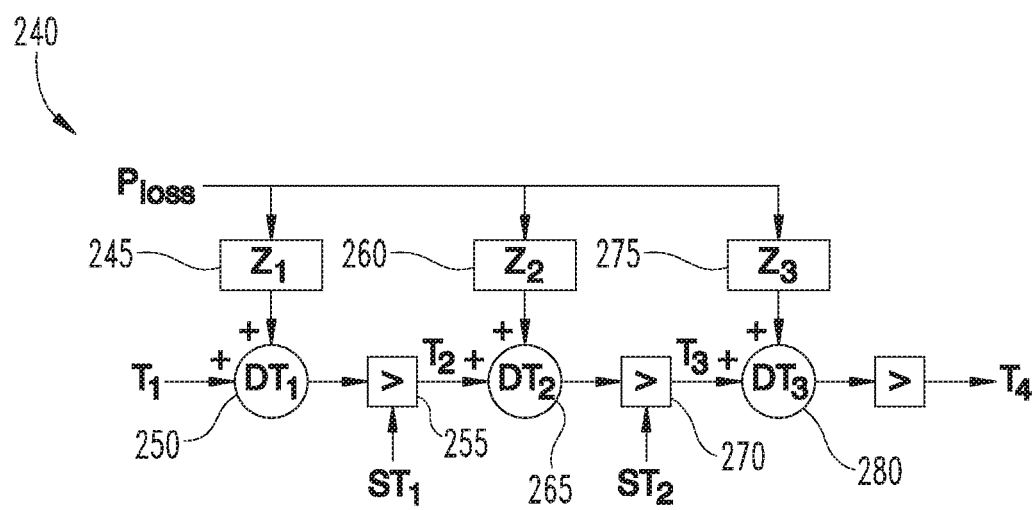
FIG. 5 is a schematic illustration of a technique for implementing the model of FIG. 4.

With further reference to FIGS. 4 and 5, further details of one non-limiting approach for estimating or determining a temperature value for an internal junction of switching device 180 and other components of variable frequency drive 155 will be provided. FIG. 4 is a schematic illustration of an equivalent circuit thermal model 230 which models the heat transfer characteristics between components of variable frequency drive 155 and may be used to determine temperature values for temperature $T_2$ representative of a temperature value for heat sink 210, temperature $T_3$ representative of a temperature value for base 190, and temperature $T_4$ representative of a temperature value for the internal junction of switching device 180. Temperature $T_1$ is representative of a temperature value of cooling medium 220 and may correspond to a sensed temperature value of cooling medium 220 provided by sensor 222 or a predetermined temperature value of cooling medium 220 that may be, for example, stored in memory of controller 160.

In model 230, resistance $R_1$ and capacitance $C_1$ represent an impedance $Z_1$ associated with a thermal loss between heat sink 210 and cooling medium 220, resistance $R_2$ and capacitance $C_2$ represent an impedance $Z_2$ associated with a thermal loss between base 190 and heat sink 210, and resistance $R_3$ and capacitance $C_3$ represent an impedance $Z_3$ associated with a thermal loss between switching device 180 and base 190. In addition, $P_{loss}$ in model 230 is representative of an estimated power loss characteristic of variable frequency drive 155 determined by controller 160 based on various operating characteristics of variable frequency drive 155.

FIG. 5 provides a schematic illustration of one non-limiting technique 240 executable by controller 160 for implementing model 230 to determine temperature values for temperatures $T_2$-$T_4$. In the illustrated form, technique 240 begins with operation 245 in which $P_{loss}$ is multiplied by impedance $Z_1$. In operation 250, the result of operation 245 is added with temperature $T_1$ to provide a determined temperature value $DT_1$ of heat sink 210. As indicated above, $T_1$ is representative of a temperature value of cooling medium 220 and may correspond to a sensed temperature value of cooling medium 220 provided by sensor 222 or a predetermined temperature value of cooling medium 220. As also indicated above, in certain forms variable frequency drive 155 may include a plurality of sensors 222 configured to measure temperatures of cooling medium 220 and provide a plurality of sensed temperature values of cooling medium 220 to controller 160. In these forms, controller 160 may be configured to select and use the highest of the plurality of sensed temperature values provided by the plurality of sensors 222 for temperature $T_1$ or to use an average or other combination of the plurality of sensed temperature values provided by the plurality of sensors 222 for temperature $T_1$. In one exemplary but non-limiting example of a form in which temperature $T_1$ represents a predetermined temperature value of cooling medium 220, temperature $T_1$ may correspond to a maximum temperature value that cooling medium 220 may reach before switching device 180 exceeds a rated thermal level.

In operation 255, determined temperature value $DT_1$ of heat sink 210 is compared to a sensed temperature value $ST_1$ of heat sink 210 provided by sensor 212 and the greater of these two values is selected as the representative temperature value $T_2$ of heat sink 210. In forms where variable frequency drive 155 includes a plurality of sensors 212 configured to measure temperatures of heat sink 210 and provide a plurality of sensed temperature values of heat sink 210 to controller 160, controller 160 is configured to select and use the highest of the plurality of sensed temperature values provided by the plurality of sensors 212 for temperature value $ST_1$. In certain forms in which $T_1$ represents or corresponds to a predetermined temperature value of cooling medium 220, controller 160 is configured to determine that switching device 180 is operating above a rated thermal level if $ST_1$ is greater than $DT_1$. Controller 160 may also be further configured to change one or more operating characteristics of variable frequency drive 155 in order to reduce its thermal output in response to determining that $ST_1$ is greater than $DT_1$. In other forms where temperature $T_1$ is based on a sensed temperature value of cooling medium 220 provided by sensor 222, controller 160 is configured to compare the greater of $ST_1$ and $DT_1$ with a predetermined value stored in memory of controller 160 for example, and if the greater of $ST_1$ and $DT_1$ exceeds the stored, predetermined value then controller 160 may determine that switching device 180 is operating above a rated thermal level and change one or more operating characteristics of variable frequency drive 155 in order to reduce its thermal output.

In operation 260 $P_{loss}$ is multiplied by impedance $Z_2$. The result of operation 260 is added with temperature value $T_2$ of heat sink 210 to provide a determined temperature value $DT_2$ of base 190 in operation 265. In operation 270, determined temperature value $DT_2$ of base 190 is compared to a sensed temperature value $ST_2$ of base 190 provided by sensor 192 and the greater of these two values is selected as the representative temperature value $T_3$ of base 190. In forms where variable frequency drive 155 includes a plurality of sensors 192 configured to measure temperatures of base 190 and provide a plurality of sensed temperature values of base 190 to controller 160, controller 160 is configured to select and use the highest of the plurality of sensed temperature values provided by the plurality of sensors 192 for temperature value $ST_2$. Controller 160 may also be configured to determine that switching device 180 is operating above a rated thermal level if $ST_2$ is greater than $DT_2$, in which case controller 160 may also be further configured to change one or more operating characteristics of variable frequency drive 155 in order to reduce its thermal output in response to determining that $ST_2$ is greater than $DT_2$. Alternatively, controller 160 may be configured to change one or more operating characteristics of variable frequency drive 155 in order to reduce its thermal output in response to determining that $ST_2$ or $DT_2$ is greater than a predetermined value stored in memory of controller 160 for example.

$P_{loss}$ is multiplied by impedance $Z_3$ in operation 275. The result of operation 275 is added with temperature value $T_3$ of base 190 to provide a determined temperature value $DT_3$ of switching device 180, which also corresponds to temperature $T_4$ representative of a temperature value for the internal junction of switching device 180. In one form, controller 160 may be configured to change one or more operating characteristics of variable frequency drive 155 in order to reduce its thermal output in response to determining that $DT_3$ or $T_4$ is greater than a predetermined value stored in memory for example that corresponds to a rated thermal level of switching device 180. Additionally or alternatively, in the event $DT_3$ or $T_4$ is below but approaching or otherwise below but close to the stored, predetermined value that corresponds to the rated thermal level of switching device 180, then controller 160 may also be configured to change one or more operating characteristics of variable frequency drive 155 in order to reduce its thermal output in order to avoid exceeding the rated thermal level of switching device 180.

It should be understood that forms in which technique 240 determines temperature values for fewer components of variable frequency drive 155 are possible. For example, in one form, technique 240 may involve determination of temperature values $T_2$ and $T_4$ where impedance $Z_3$ would reflect the omission of the determination of temperature value $T_3$. In one or more alternative forms, determination of temperature value $T_2$ of heat sink 210 may be omitted from technique 240, and technique 240 may begin by providing $ST_1$ as the result of operation 255. Still, it should be understood that other alternatives and variations are contemplated and possible.

Figure 6:
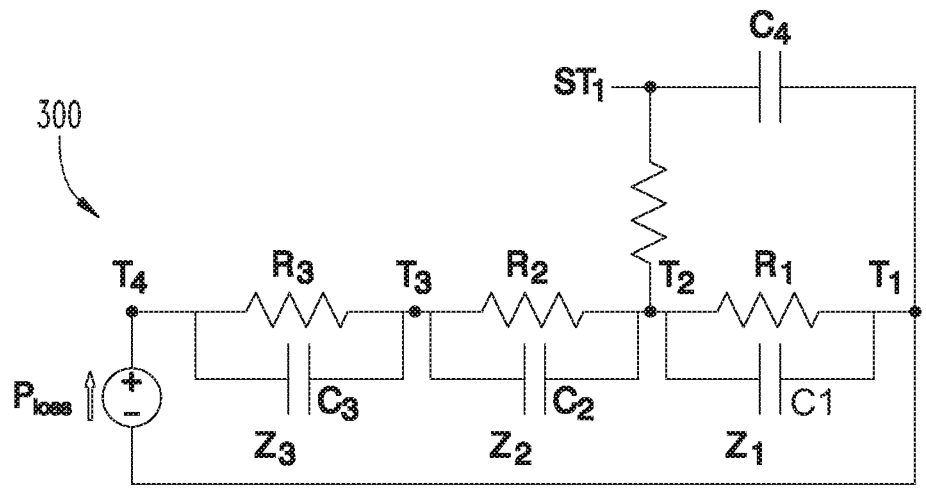
FIG. 6 is a schematic illustration of an alternative embodiment equivalent circuit thermal model.
Figure 7:
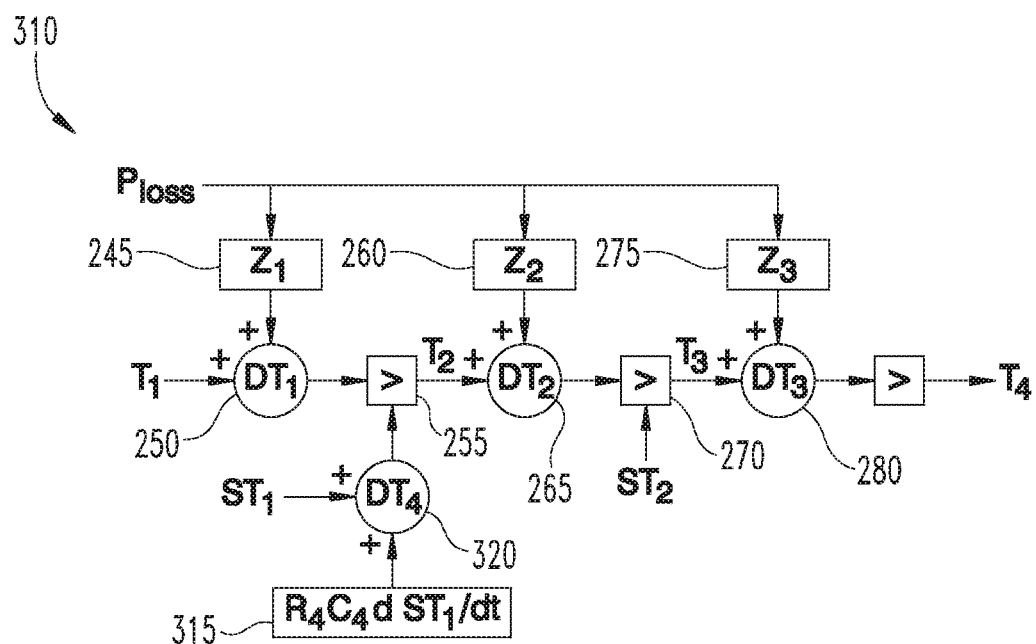
FIG. 7 is a schematic illustration of a technique for implementing the model of FIG. 6.

Referring now to FIGS. 6 and 7, further details of another non-limiting approach for estimating or determining a temperature value for the internal junction of switching device 180 and other components of variable frequency drive 155 will be provided. FIG. 6 is a schematic illustration of an equivalent circuit thermal model 300 where like references refer to like features previously described. Model 300 is substantially similar to model 230 but further accounts for delays in sensing the temperature of heat sink 210 under dynamic conditions due to the amount of thermal capacitance of heat sink 210. In model 300, $R_4$ represents an equivalent impedance (resistive and capacitive) of the path over which heat is nominally flowing through heat sink at a sensed location. $C_4$ represents the thermal capacity of the heat sink at a sensed location. $R_4$ and $C_4$ are used to calculate a thermal time constant of heat sink 210 in technique 310 schematically illustrated in FIG. 7, where like references refer to like features previously described. More particularly, in operation 315 $R_4$ and $C_4$ are used along with a sensed temperature value $ST_1$ of heat sink 210 provided by sensor 212 to calculate a thermal time constant $K_{tHS}$ of heat sink 210 according to the following equation:

$$K_{tHS} = R_4 \times C_4 \times \frac{dST_1}{dt}$$

In operation 320, the result of operation 315 is added with temperature $ST_1$ to provide a second determined temperature value $DT_4$ of heat sink 210. In forms where variable frequency drive 155 includes a plurality of sensors 212 configured to measure temperatures of heat sink 210 and provide a plurality of sensed temperature values of heat sink 210 to controller 160, controller 160 is configured to select and use the highest of the plurality of sensed temperature values provided by the plurality of sensors 212 for temperature value $ST_1$ in operations 315 and 320. In operation 255, determined temperature value $DT_1$ of heat sink 210 is compared to determined temperature value $DT_4$ of heat sink 210 and the greater of these two values is selected as the representative temperature value $T_2$ of heat sink 210. It should be understood that beyond the description provided for operations 315, 320 and 255, the remaining operations of technique 310 are executed in the same manner as described above in connection with technique 240. It shall be further understood that the techniques, methods, controls, diagnostics, and logic disclosed herein may be implemented in a variety of software, hardware, firmware, and combinations thereof.

While the invention has been illustrated and described in detail in the drawings and foregoing description, the same is to be considered as illustrative and not restrictive in character, it being understood that only certain embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
   inverter circuitry including one or more transistors in thermal communication with a substrate;
   a heat sink in thermal communication with the inverter circuitry; and
   a controller configured to:
      determine a temperature of the heat sink;
      determine a temperature of the substrate as the greater of a sensed temperature value of the substrate and a calculated temperature value of the substrate based upon the determined temperature of the heat sink; and
      determine an internal temperature of the one or more transistors based upon the determined temperature of the substrate and a thermal impedance between the substrate and the one or more transistors.

2. The system of claim 1, further comprising a sensor configured to provide a sensed temperature value of the heat sink to the controller, wherein the controller is further configured to determine if the inverter circuitry is operating above a rated level if the sensed temperature value of the heat sink is greater than a calculated temperature value of the heat sink.

3. The system of claim 1, wherein the one or more transistors physically contact the substrate and the substrate physically contacts the heat sink.

4. The system of claim 1, wherein the internal temperature of the one or more transistors is a junction temperature.

5. The system of claim 4, wherein the one or more transistors comprise one or more insulated gate bipolar transistors.

6. The system of claim 1, further comprising a first plurality of sensors configured to provide a plurality of measured temperatures of the heat sink, and a second plurality of sensors configured to provide a plurality of measured temperatures of the substrate.

7. The system of claim 6, wherein the controller is further configured to:

determine a sensed temperature value for the heat sink based on a highest one of the plurality of measured temperatures of the heat sink; and determine the sensed temperature value for the substrate based on a highest one of the plurality of measured temperatures of the substrate.

8. The system of claim 1, further comprising a motor electrically coupled with an output of the inverter circuitry.

9. The system of claim 8, wherein the motor is a permanent surface magnet motor.

10. The system of claim 1, wherein the controller is further configured to determine the temperature of the heat sink as the greater of a sensed value and a calculated value.

11. The system of claim 10, wherein the calculated value is based upon a power lows associated with the inverter circuitry, a thermal impedance between the heat sink and a cooling medium in thermal communication with the heat sink, and one of a sensed temperature of the cooling medium and a predetermined temperature value of the cooling medium.

12. The system of claim 10, wherein the controller is further configured to determine that the inverter circuitry is operating above a rated temperature if a highest one of a plurality of measured temperatures of the heat sink is greater than the calculated temperature value of the heat sink.

* * * * *